(12) United States Patent
Ikeda et al.

(10) Patent No.: US 8,406,542 B2
(45) Date of Patent: Mar. 26, 2013

(54) IMAGE DECODING APPARATUS, IMAGE DECODING METHOD AND COMPUTER PROGRAM

(75) Inventors: Hiroshi Ikeda, Kanagawa (JP); Yuji Wada, Tokyo (JP); Kazuhiro Shimauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/615,409

(22) Filed: Nov. 10, 2009

(65) Prior Publication Data

US 2010/0119167 A1      May 13, 2010

(30) Foreign Application Priority Data

Nov. 11, 2008    (JP) ................. 2008-288604

(51) Int. Cl.
*G06K 9/36* (2006.01)
(52) U.S. Cl. ...................................................... 382/233
(58) Field of Classification Search .................. 382/232, 382/233, 248; 375/240.18, 240.19, 240.2
See application file for complete search history.

(56) References Cited

U.S. PATENT DOCUMENTS

| | | | |
|---|---|---|---|
| 5,414,469 A * | 5/1995 | Gonzales et al. | 375/240.18 |
| 6,549,672 B1 * | 4/2003 | Kondo et al. | 382/239 |
| 6,885,395 B1 * | 4/2005 | Rabbani et al. | 348/231.1 |
| 7,916,952 B2 * | 3/2011 | Demos | 382/232 |
| 2005/0091051 A1 * | 4/2005 | Moriya et al. | 704/229 |
| 2006/0071825 A1 * | 4/2006 | Demos | 341/50 |

FOREIGN PATENT DOCUMENTS

| | | |
|---|---|---|
| JP | 2002-165098 | 6/2002 |
| JP | 2002-204357 | 7/2002 |
| JP | 2003-230141 A | 8/2003 |
| JP | 2004-260539 | 9/2004 |
| JP | 2007-251672 A | 9/2007 |

OTHER PUBLICATIONS

Wada et al., A Method for Control and Improvement of POI Image Quality in JPEG2000, Technical Research Report of Institute of Electronics, Information and Communication Engineers. Dec. 9, 2004;104(511):7-12.

* cited by examiner

*Primary Examiner* — Samir Ahmed
(74) *Attorney, Agent, or Firm* — Wolf, Greenfield & Sacks, P.C.

(57) ABSTRACT

An image decoding apparatus includes an information acquisition section that acquires information of a bit-plane truncation position in an encoded stream from the encoded stream generated by performing bit-plane encoding on a transform coefficient, a decoding process section that performs a decoding process on the encoded stream and generates a transform coefficient, and a significant coefficient detection section that detects whether the transform coefficient generated in the decoding process section is significant. The image decoding apparatus includes a correction value acquisition section that acquires a correction value corresponding to the bit-plane truncation position in the transform coefficient detected to be significant, from a correction value table, and a coefficient correction processing section that performs coefficient correction processing on the transform coefficient using the correction value acquired in the correction value acquisition section only for the transform coefficient detected to be significant in the significant coefficient detection section.

7 Claims, 17 Drawing Sheets

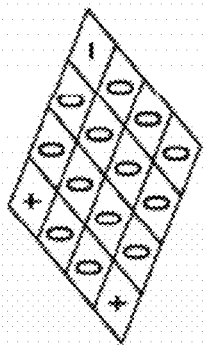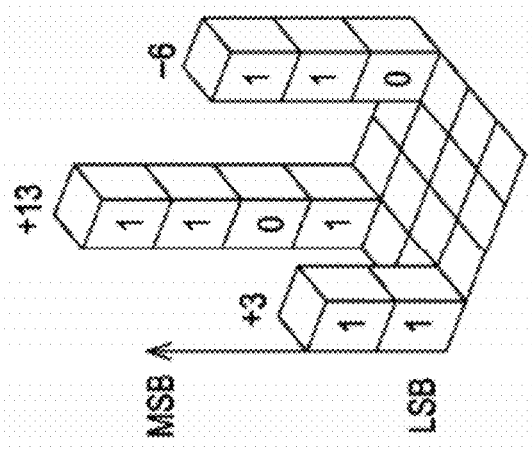

FIG. 8B

| | | | | | | | | | | COEFFICIENT VALUE |
|---|---|---|---|---|---|---|---|---|---|---|
| 0 | 0 | 1 | 1 | 0 | 1 | 0 | 0 | 0 | | 104 |
| 0 | 0 | 1 | 1 | 0 | 0 | 0 | 0 | 0 | | 96 |
| 0 | 0 | 0 | 0 | 0 | 0 | 0 | 0 | 0 | | 0 |
| 0 | 0 | 0 | 0 | 0 | 1 | 1 | 0 | 0 | | 12 |
| 0 | 1 | 1 | 1 | 1 | 0 | 0 | 0 | 0 | | 240 |
| 0 | 0 | 0 | 1 | 1 | 0 | 0 | 0 | 0 | | 48 |

Bit-plane truncation position: 10, 9, 8, 7, 6, 5, 4, 3, 2, 1

FIG. 8A

| | | | | | | | | | COEFFICIENT VALUE |
|---|---|---|---|---|---|---|---|---|---|
| 0 | 0 | 1 | 1 | 0 | 1 | 0 | 0 | 1 | 105 |
| 0 | 0 | 1 | 1 | 0 | 0 | 0 | 1 | 1 | 98 |
| 0 | 0 | 0 | 0 | 0 | 0 | 0 | 1 | 1 | 3 |
| 0 | 0 | 0 | 0 | 1 | 1 | 0 | 0 | 0 | 12 |
| 0 | 1 | 1 | 1 | 1 | 0 | 0 | 1 | 0 | 242 |
| 0 | 0 | 0 | 1 | 1 | 0 | 1 | 0 | 0 | 52 |

FIG. 9

| BIT-PLANE TRUNCATION POSITION | |
|---|---|
| 10 | 148 |
| 9 | 91 |
| 8 | 52 |
| 7 | 26 |
| 6 | 12 |
| 5 | 7 |
| 4 | 3 |
| 3 | 2 |
| 2 | 1 |
| 1 | 0 |

FIG. 11A FIG. 11B FIG. 11C

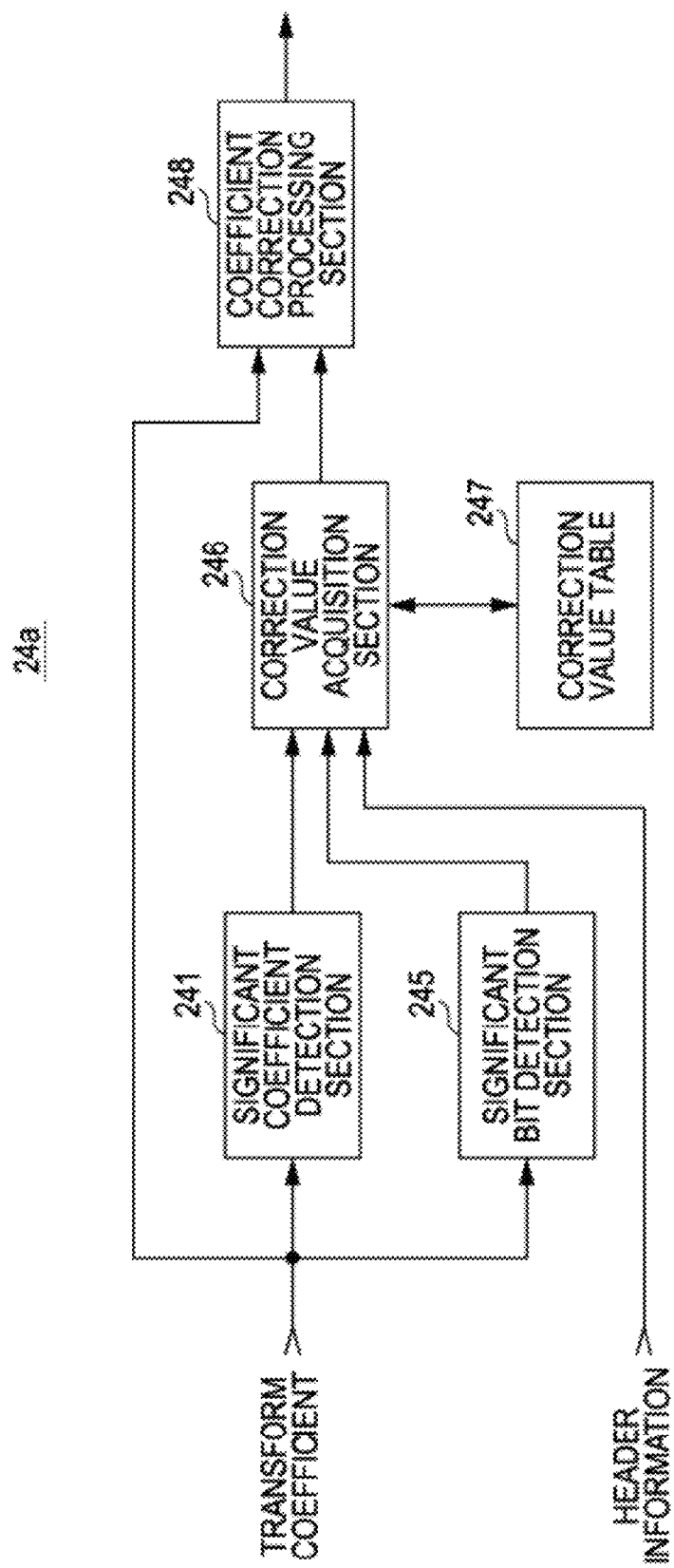

FIG. 13

| SIGNIFICANT BIT | | | | | | | | | | |
|---|---|---|---|---|---|---|---|---|---|---|
| 1 | 0 | – | – | – | – | – | – | – | – | 0 |
| 2 | 0 | – | – | – | – | – | – | 1 | 1 | 0 |
| 3 | 0 | – | – | – | – | 2 | 1 | 1 | 0 |
| 4 | 0 | – | – | – | 6 | 3 | 1 | 1 | 0 |
| 5 | 0 | – | – | 12 | 6 | 3 | 2 | 1 | 0 |
| 6 | 0 | – | 25 | 12 | 6 | 3 | 2 | 1 | 0 |
| 7 | 0 | 50 | 25 | 12 | 7 | 3 | 2 | 1 | 0 |
| 8 | 0 | 90 | 50 | 26 | 12 | 7 | 4 | 2 | 1 | 0 |
| 9 | 148 | 95 | 55 | 27 | 12 | 7 | 4 | 2 | 1 | 0 |
| 10 | 9 | 8 | 7 | 6 | 5 | 4 | 3 | 2 | 1 |

BIT-PLANE TRUNCATION POSITION

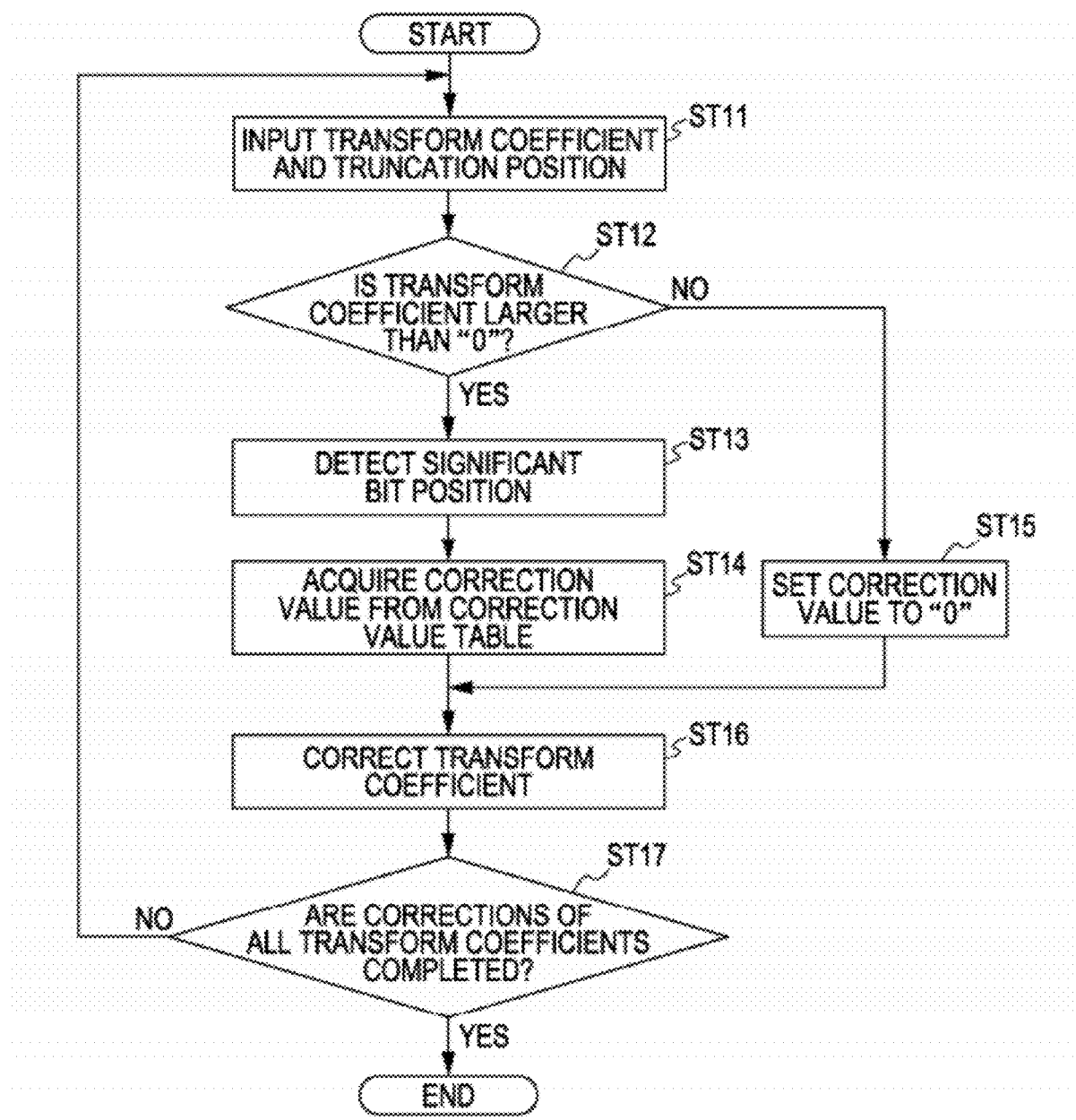

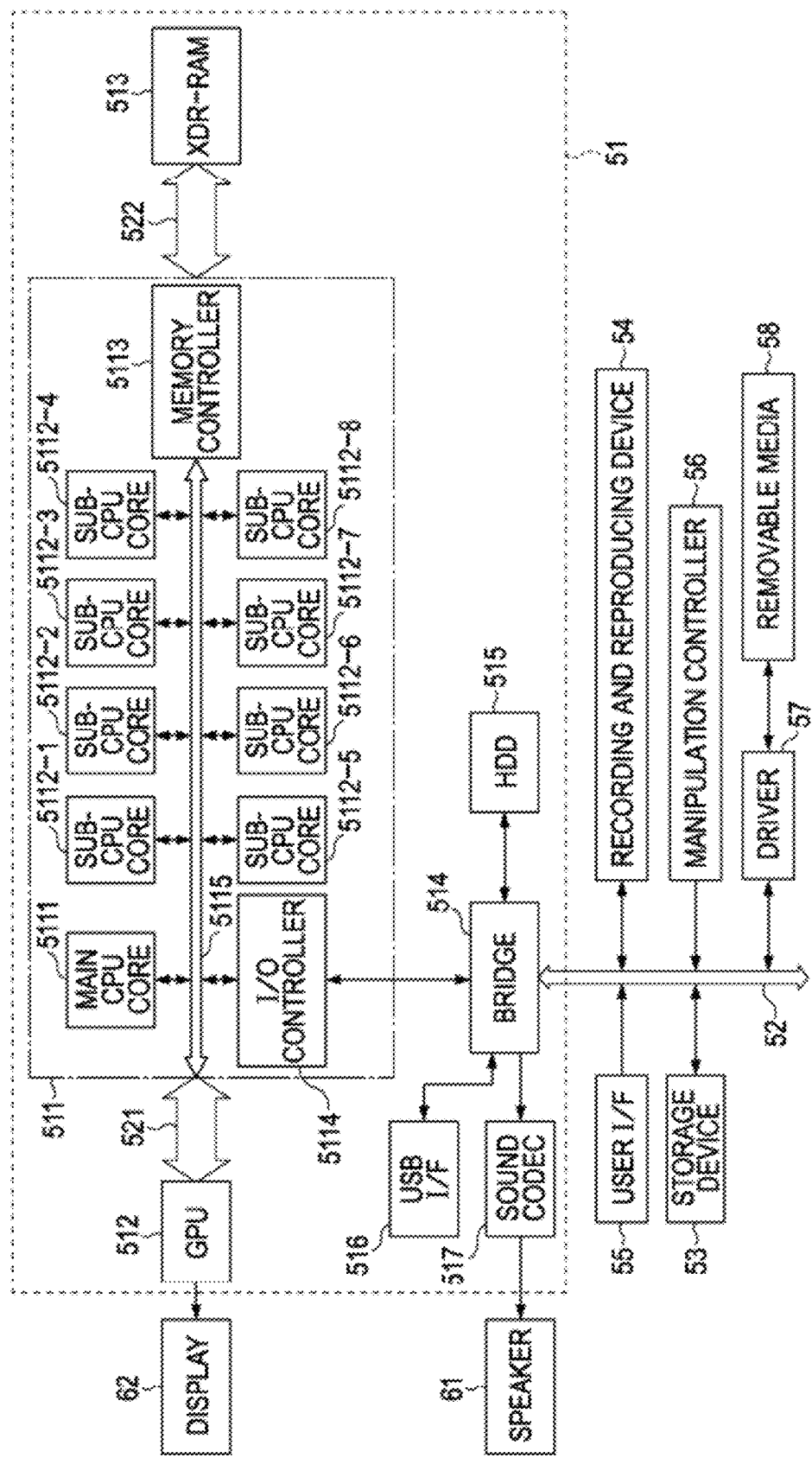

IMAGE DECODING APPARATUS, IMAGE DECODING METHOD AND COMPUTER PROGRAM

CROSS REFERENCE TO RELATED APPLICATIONS

The present application claims priority under 35 U.S.C. §119 to, and contains subject matter related to that disclosed in, Japanese Priority Patent Application JP2008-288604, filed in the Japan Patent Office on Nov. 11, 2008, the entire contents of which are hereby incorporated by reference.

BACKGROUND OF THE INVENTION

1. Field of the Invention

The present invention relates to an image decoding apparatus, an image decoding method and a computer program. More specifically, the present invention relates to an image decoding apparatus, an image decoding method and a computer program that utilize a correction value table where a correction value, previously prepared by statistically processing a coefficient value truncated by a bit-plane truncation, is stored for every bit-plane truncation position, and that stably suppress a sense of incongruity or a sense of confusion occurring in a reproduced image by executing correction on the transform coefficient obtained by performing a decoding process on an encoded stream using the correction value, corresponding to the bit-plane truncation position, read from the correction value table.

2. Description of the Related Art

One of the typical image compression schemes according to the related art is, for example, the JPEG (Joint Photographic Experts Group) scheme standardized by the ISO (International Standards Organization). This scheme utilizes discrete cosine transform (DCT). When a relatively high bit is assigned, it has been shown that excellent encoded and decoded images are obtained. Recently, wavelet transform encoding has been used in which an image is divided into a plurality of bands by a filter that is a combination of a high-pass filter and a low-pass filter, called a filter bank, and encoding is performed for each band. The wavelet transform encoding has been considered as new prevailing technology which will take over from DCT because the wavelet transform encoding does not have the drawback of block distortion conspicuously appearing with high compression as in DCT.

The JPEG-2000 scheme has been standardized as an image compression scheme using such wavelet transform encoding. The JPEG-2000 scheme is a scheme that is a combination of the wavelet transform and bit-plane encoding, and realizes great improvement in encoding efficiency as compared with JPEG.

In addition, Japanese Unexamined Patent Application Publication No 2002-165098 discloses that rate control is made possible by performing a bit-plane truncation process for truncating a generated encoded stream data from the tail end thereof, in order to be capable of obtaining a target amount of code when using the JPEG-2000 scheme. Meanwhile, Japanese Unexamined Patent Application Publication No 2004-260539 discloses that it is performed to suppress a sense of incongruity or a sense of confusion occurring in a reproduced image by generating random numbers expressible by the number of truncated bits and adding the random numbers to a wavelet coefficient, when decoding is performed using the encoded stream data on which the bit-plane truncation has been performed. In addition, Japanese Unexamined Patent Application Publication No 2002-204357 discloses that as replacement of the signal component lost in the irreversible compression process, noise is included in decoded image data as a pseudo signal to thereby make improvements in deterioration of an image quality due to signal loss at the time of encoding. In addition, it is also performed to use substantially central values of values expressible by the number of truncated bits as values shown by the truncated bits.

SUMMARY OF THE INVENTION

However, since random numbers added in the wavelet coefficient or noise included in the decoded image data, and the substantially central values of the values expressible by the number of truncated bits, and the like have no relation to an image before encoding, it is difficult to stably suppress a sense of incongruity and the like occurring in a reproduced image due to bit-plane truncation.

For this reason, the present invention provides an image decoding apparatus, an image decoding method and a computer program which are capable of stably suppressing a sense of incongruity or a sense of confusion occurring in the reproduced image due to bit-plane truncation.

According to an embodiment of the present invention, there is provided an image decoding apparatus including: an information acquisition section that acquires information of a bit-plane truncation position in an encoded stream, from the encoded stream generated by performing a bit-plane encoding process on a transform coefficient obtained by frequency conversion of image data; a decoding process section that performs a decoding process on the encoded stream and generates a transform coefficient; a significant coefficient detection section that detects whether the transform coefficient generated in the decoding process section is significant; a correction value acquisition section that acquires a correction value, which corresponds to the bit-plane truncation position in the transform coefficient detected to be significant in the significant coefficient detection section, from a correction value table where a correction value, previously prepared by statistically processing a coefficient value truncated by the bit-plane truncation, is stored for each bit-plane truncation position; and a coefficient correction processing section that performs coefficient correction processing on the transform coefficient using the correction value acquired in the correction value acquisition section only for the transform coefficient detected to be significant in the significant coefficient detection section.

In an embodiment of the present invention, information of a bit-plane truncation position in an encoded stream is acquired from the encoded stream generated by performing a bit-plane encoding process on a transform coefficient obtained by frequency conversion of image data. Further, in the correction value table, a correction value is stored which is previously prepared by statistically processing a coefficient value truncated by the bit-plane truncation, in other words, a central value representative of the distribution of the coefficient value truncated the bit-plane truncation, for each context which is characteristics of the bit-plane truncation position or the input image data, for example, any one of a significant bit position, color component information and frequency component information, or a combination thereof. The transform coefficient obtained by performing decoding process on the encoded stream is corrected using the correction value acquired from the correction value table depending on the bit-plane truncation position or the context. The transform coefficient after this correction is inversely transformed into output image data and is output.

According to another embodiment of the present invention, there is provided an image decoding method including the steps of: acquiring information of a bit-plane truncation position in an encoded stream by an information acquisition section, from the encoded stream generated by performing a bit-plane encoding process on a transform coefficient obtained by frequency conversion of image data; performing a decoding process on the encoded stream and generating a transform coefficient by a decoding process section; detecting whether the transform coefficient generated in the decoding process section is significant by a significant coefficient detection section; acquiring a correction value, which corresponds to the bit-plane truncation position in the transform coefficient detected to be significant in the significant coefficient detection section, by a correction value acquisition section, from a correction value table where a correction value, previously prepared by statistically processing a coefficient value truncated by the bit-plane truncation, is stored for each bit-plane truncation position; and performing coefficient correction processing on the transform coefficient by a coefficient correction processing section using the correction value acquired in the correction value acquisition section only for the transform coefficient detected to be significant in the significant coefficient detection section.

According to still another embodiment of the present invention, there is provided a computer program prompting a computer to function as functional units for: acquiring information of a bit-plane truncation position in an encoded stream from the encoded stream generated by performing a bit-plane encoding process on a transform coefficient obtained by frequency conversion of image data; performing a decoding process on the encoded stream and generating a transform coefficient; detecting whether the transform coefficient generated by performing a decoding process on the encoded stream is significant; acquiring a correction value, which corresponds to the bit-plane truncation position in the transform coefficient detected to be significant in a significant coefficient detection section, from a correction value table where a correction value, previously prepared by statistically processing the coefficient value truncated by the bit-plane truncation, is stored for each bit-plane truncation position; and performing coefficient correction processing on the transform coefficient using the correction value acquired from the correction value table only for the transform coefficient detected to be significant.

Meanwhile, a computer program according to an embodiment of the present invention, for example, a computer program which is capable of being provided for a general-purpose computer system and capable of executing a variety of program codes, supplied by a storage medium and a communication medium, for example, the storage medium such as an optical disk, a magnetic disk and a semiconductor memory, or the communication medium such as a network, which are provided in computer readable formats. Processing according to the program is realized on the computer system by providing such a program in computer readable formats.

According to the embodiments of the present invention, a correction value table is utilized in which a correction value, previously prepared by statistically processing a coefficient value truncated by a bit-plane truncation, is stored for each bit-plane truncation position, and correction on the transform coefficient obtained by performing a decoding process on an encoded stream is executed using the correction value, corresponding to the bit-plane truncation position, read from the correction value table. Therefore, it is possible to stably suppress a sense of incongruity or a sense of confusion occurring in a reproduced image, since correction on the transform coefficient is executed using the optimal correction value.

BRIEF DESCRIPTION OF THE DRAWINGS

FIG. 3 is a diagram for explaining bit-planes.

FIG. 8 is a diagram for explaining an operation of the transform coefficient correction section.

FIG. 9 is a diagram illustrating a correction value table.

FIG. 11 is a diagram illustrating a correction example of the transform coefficients.

FIG. 12 is a diagram illustrating another configuration of the transform coefficient correction section.

FIG. 13 is a diagram illustrating another example of the correction value table.

FIG. 14 is a flowchart illustrating another operation of the transform coefficient correction section.

FIG. 15 is a diagram illustrating another correction example of the transform coefficients.

FIG. 17 is a diagram illustrating the configuration of a computer.

DESCRIPTION OF THE PREFERRED EMBODIMENTS

Figure 1:
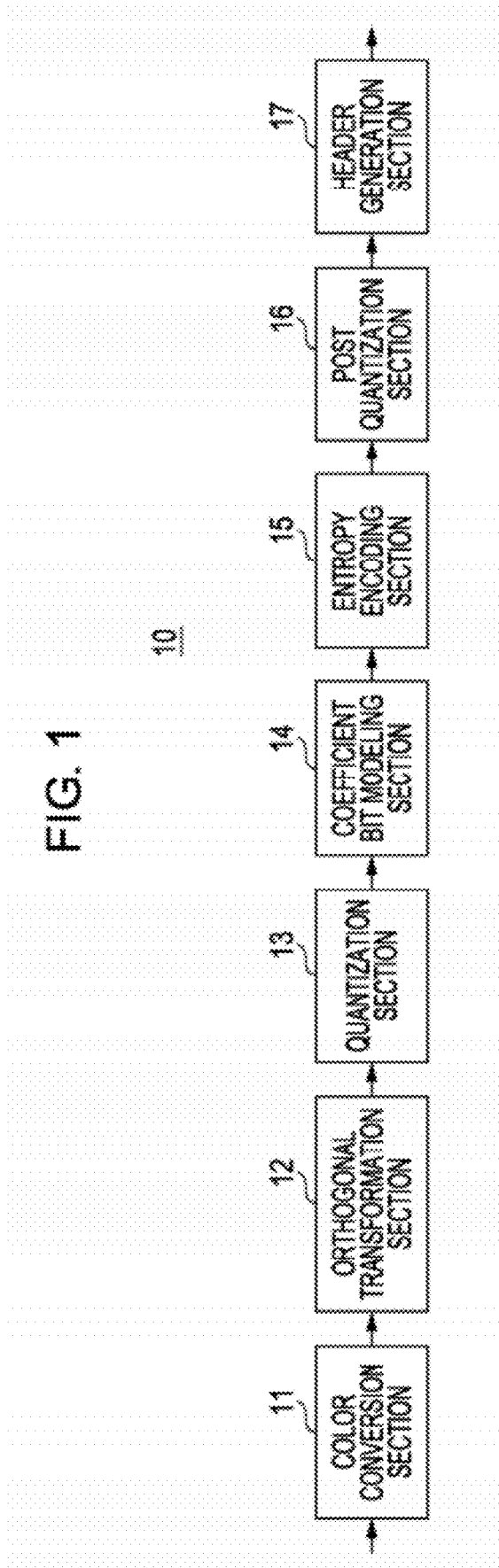
FIG. 1 is a block diagram illustrating the configuration of an image encoding apparatus.

Hereinafter, the best embodiment for implementing the present invention will be described. The descriptions are given in the following order.
1. Configuration and Operation of an Image Encoding Apparatus
2. First Embodiment of an Image Decoding Apparatus
3. Second Embodiment of the Image Decoding Apparatus
4. Configuration and Operation When Image Decoding is Performed Using a Computer 1. Configuration and Operation of an Image Encoding Apparatus Configuration of an Image Encoding Apparatus FIG. 1 is a block diagram illustrating the configuration of an image encoding apparatus. A color conversion section 11 of an image encoding apparatus 10 converts image data input from an arbitrary color space into an specific color space. The color conversion section 11 converts, for example, image data of R, G, and B into image data of Y, Cb, Cr or the like. In addition, the color conversion section 11 is a device provided in the image encoding apparatus 10 as required.

An orthogonal transformation section 12 transforms each of the pixel values of the image data, which are converted by the color conversion section 11, from spatial coordinates to frequency coordinates to thereby output transform coefficients. The orthogonal transformation section 12 outputs the transform coefficients obtained by performing, for example, wavelet transform (DWT), discrete cosine transform (DCT), discrete Fourier transform (DFT) and the like.

A quantization section 13 quantizes the transform coefficients output from the orthogonal transformation section 12, and outputs the quantized coefficients. However, the quantization section 13 is not indispensable to the image encoding apparatus 10.

A coefficient bit modeling section 14 performs processing for transforming the transform coefficients quantized by the quantization section 13 so as to be efficiently encoded in an entropy encoding section 15. The coefficient bit modeling section 14 performs bit modeling such as resolution into 3-pass in, for example, the zigzag scan or the JPEG 2000.

The entropy encoding section 15 performs entropy encoding on data processed by the coefficient bit modeling section 14.

A post quantization section 16 performs post quantization ("truncation") on bit stream obtained in the entropy encoding. The post quantization is bit-plane truncation processing for truncating the subsequent data occurring after the bit stream reaches a target amount of data. For this reason, it is possible to suppress the bit stream output from the post quantization section 16 to a desired amount of data. A header generation section 17 generates header information, and outputs the header information in addition to the bit stream output from the post quantization section 16.

Operation of an Image Encoding Apparatus

Next, an operation of the image encoding apparatus 10 will be described in which, for example, the wavelet transform is performed in the orthogonal transformation section 12 to thereby executing a bit-plane development in the coefficient bit modeling section 14. For ease of explanation, the quantization section 13 is assumed not to be provided.

Figure 2:
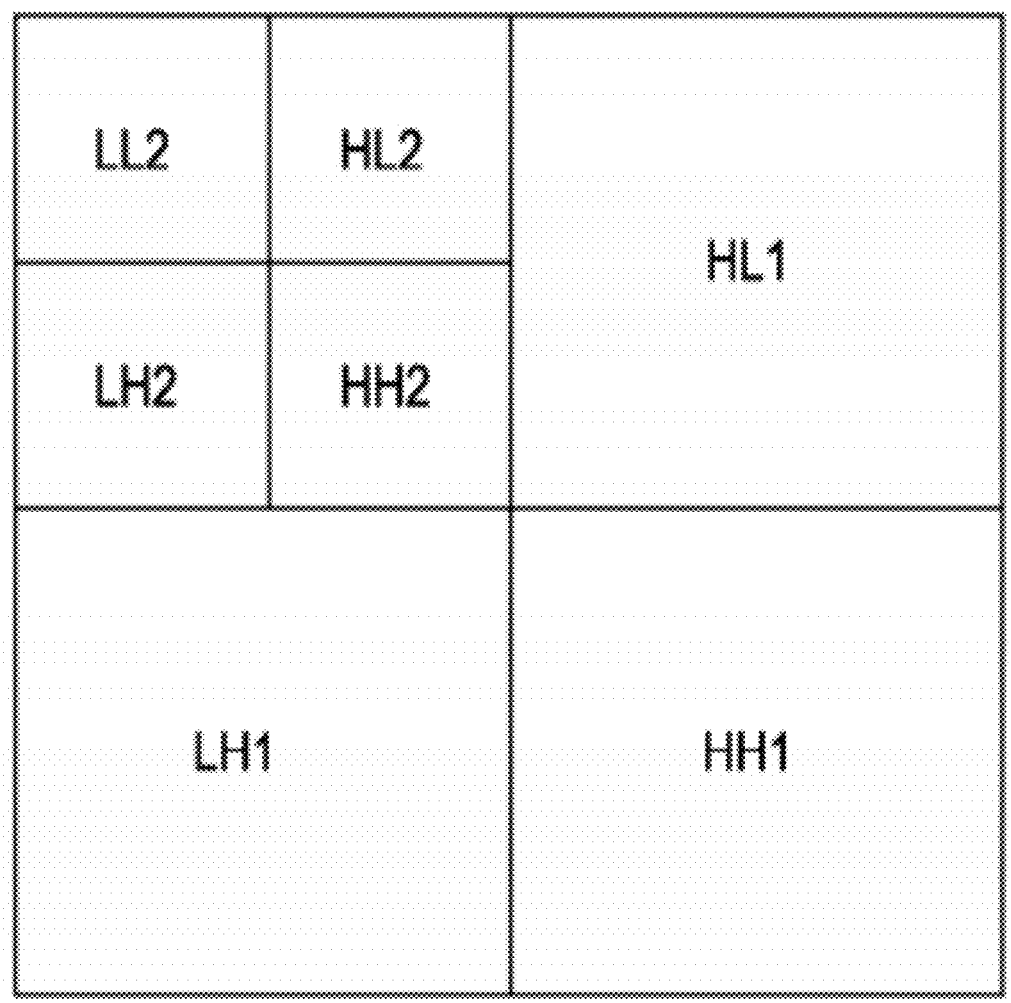
FIG. 2 is a diagram illustrating sub-bands.

When the wavelet transform is performed, the orthogonal transformation section 12 is configured to use a filter bank. The filter bank is generally configured to use, for example, a low-pass filter and a high-pass filter. The orthogonal transformation section 12 generates the wavelet transform coefficients by performing a filtering operation using the filter bank. FIG. 2 shows sub-bands when the wavelets have been divided up to the second stage. Since most image energies are concentrated in the low-pass components in the wavelet transform, a device is generally taken that is configured to repeat the transformation of the low-pass components, such as lowest pass sub-band LL2, low-high pass sub-band LH2, high-low pass sub-band HL2, and highest pass sub-band HH2 up to the second level, as shown in FIG. 2.

When the number of levels of the wavelet transform is set to "2", a total of seven sub-bands, lowest pass sub-band LL2, low-high pass sub-band LH2, high-low pass sub-band HL2, and highest pass sub-band HH2 up to the second level, low-high pass sub-band LH1, high-low pass sub-band HL1, and highest pass sub-band HH1 of the first level, are generated as shown in FIG. 2.

The coefficient bit modeling section 14 divides the transform coefficients into code blocks of a predetermined size, and develops each of the transform coefficients on the bit-plane. A horizontal and vertical size of the code block is the 4th to the 256th power of 2, and dimensions typically used are 32×32, 64×64, 128×32, or the like.

FIG. 3 is a diagram for explaining bit-planes. FIG. 3(A) is assumed to be constituted by, for example, a total of sixteen transform coefficients, four vertical and four horizontal in one code block. Among these sixteen transform coefficients, the maximum absolute value is 13, and 1101 when expressed in binary form. The coefficient bit modeling section 14 sequentially slices the absolute values of the transform coefficients into each of the bits from the least significant bit (LSB) to the most significant bit (MSB), to thereby generate the absolute value bit-planes corresponding to each sample. Herein, when the transform coefficients are the same as those shown in FIG. 3(A), four absolute value bit-planes are generated as shown in FIG. 3(B). In addition, the coefficient bit modeling section 14 generates a sign bit-plane representing signs of the transform coefficients as shown in FIG. 3(C).

That is, when the transform coefficients are expressed in, for example, n-bit signed binary form, from bit 0 to bit n−2 expresses each of the bits from LSB to MSB, and the remaining one bit expresses a sign. Therefore, in this case, the coefficient bit modeling section 14 generates (n−1) absolute value bit-planes and one absolute value bit-plane.

Next, the coefficient bit modeling section 14 performs the encoding on the code blocks in order starting from the absolute value bit-plane of the MSB side on the basis of three encoding passes. These three encoding passes include the encoding passes called significance propagation pass, magnitude refinement pass, and cleanup pass.

The significance propagation pass is the encoding with respect to coefficients that are non-significant with significant coefficients that exist nearby. The magnitude refinement pass is the encoding with respect to significant coefficients. The cleanup pass is the encoding with respect to coefficients not included in coefficients of the significance propagation pass or the magnitude refinement pass. In addition, being significant represents a state determined not to be already "0".

Three encoding passes are constituted so that the bit-plane of the MSB side is initially encoded by the cleanup pass. Subsequently, toward the LSB, the encoding on each of the bit-planes is sequentially performed by the significance propagation pass, the magnitude refinement pass, and the cleanup pass. Further, when "1" first emerges in the bit-plane, polar bit encoding is performed. The number of the bit-plane from the MSB side that actually first appears as "1" is written into a header, and the bit-planes with all first zeros are not encoded.

The entropy encoding section 15 performs the entropy encoding on 0/1 values (binary decision) obtained in the coefficient bit modeling section 14. In the entropy encoding section 15, by using, for example, arithmetic codes called MQ encoding, code strings of the binary decision are compressed with no distortions to thereby generate the bit stream.

The post quantization section 16 performs the post quantization on the bit stream obtained in the entropy encoding, and truncates the subsequent data after the bit stream reaches a target amount of data. Here, when the bit stream reaches the target amount of data, the post quantization section 16 detects an end point of the encoding pass, and truncates the subsequent bit stream using the end point of the encoding pass initially detected as a bit-plane truncation position. Therefore, it is possible to suppress the amount of data of the bit stream to the target amount of data.

The header generation section 17 generates header information representing the number of encoding passes or the data length of the bit stream within the code block, the bit-plane truncation position and the like, adds the information in the bit stream output from the post quantization section 16, and outputs the information as the encoded stream. Further, in the header information, it is also possible to include color component information representing which color component coefficient the transform coefficient denoted by the encoded stream corresponds to, or frequency component information representing which frequency component coefficient (which sub-band coefficient) that it corresponds to, and the like.

Figure 4:
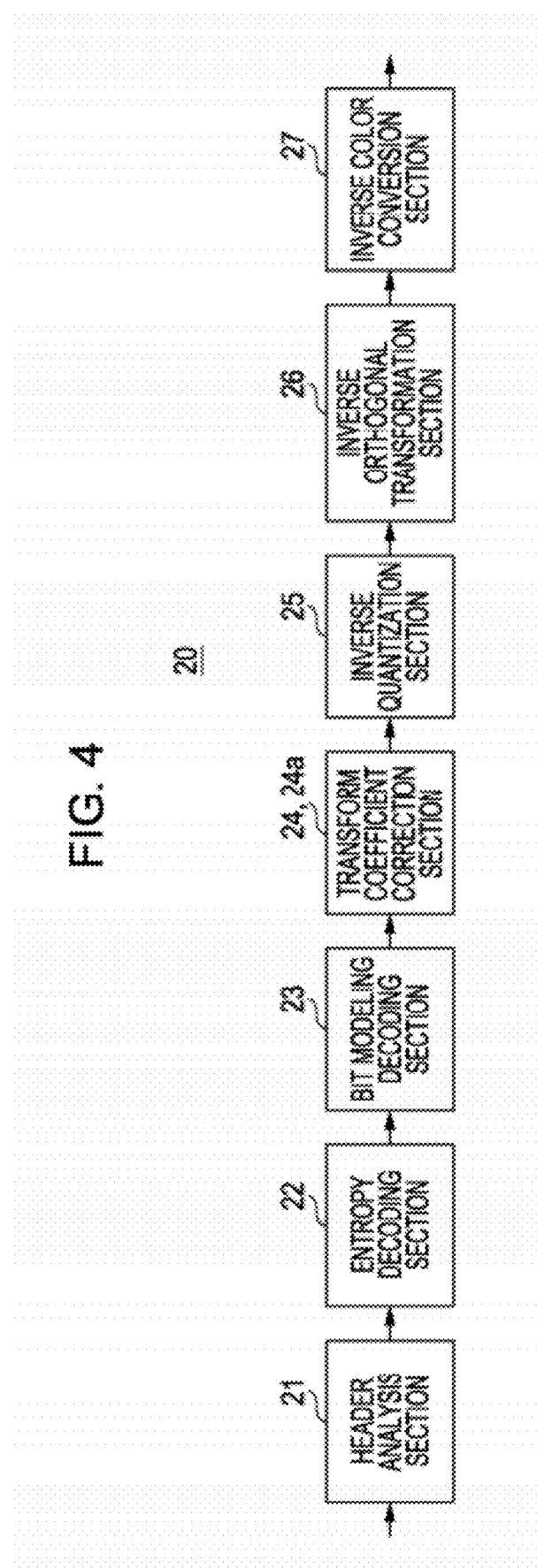
FIG. 4 a block diagram illustrating the configuration of an image decoding apparatus.

2. First Embodiment of an Image Decoding Apparatus Configuration of an Image Decoding Apparatus FIG. 4 is a block diagram illustrating the configuration of an image decoding apparatus. An header analysis section 21 of the image decoding apparatus 20 extracts the header information which is added in the encoded stream output from the image encoding apparatus 10, performs an analysis on the header information, and acquires information of the bit-plane truncation position. In addition, the header analysis section 21 performs the acquisition on information representing which color component coefficient that the transform coefficient of the encoded stream corresponds to, and information representing which frequency component coefficient that the transform coefficient of the encoded stream corresponds to, or the like. Further, the header analysis section 21 supplies the acquired information via the entropy decoding section 22 and the like, or from the header analysis section 21 to a transform coefficient correction section 24.

The entropy decoding section 22 and the bit modeling decoding section 23 are decoding process sections that perform decoding processes on the encoded stream to obtain the transform coefficients. The entropy decoding section 22 performs decoding corresponding to encoding to be performed in the entropy encoding section 15. This entropy decoding section 22 performs decoding on the encoded stream supplied from the header analysis section 21, and supplies data obtained by decoding to the bit modeling decoding section 23.

The bit modeling decoding section 23 is responsible to perform decoding corresponding to encoding of the coefficient bit modeling section 14. The bit modeling decoding section 23 performs decoding based on the bit-plane with respect to the data output from the entropy decoding section 22 to seek the transform coefficients.

The transform coefficient correction section 24 performs the correction processing on the transform coefficients output from the bit modeling decoding section 23, in order to reduce the adverse affects due to the bit-plane truncation performed in the post quantization section 16 of the image encoding apparatus 10.

The inverse quantization section 25 performs inverse quantization corresponding to quantization to be performed in the quantization section 13. The inverse quantization section 25 multiplies a quantization step size when quantization is performed in the quantization section 13 by the transform coefficients output from the transform coefficient correction section 24, and performs the inverse quantization process. Meanwhile, when the quantization section 13 is not provided in the image encoding apparatus 10 and the quantization is not performed, it is not necessary to perform the inverse quantization by providing the inverse quantization section 25.

An inverse orthogonal transformation section 26 performs an inverse orthogonal transformation corresponding to the orthogonal transformation of the orthogonal transformation section 12. The inverse orthogonal transformation section 26 performs the inverse orthogonal transformation using the transform coefficients supplied from the inverse quantization section 25, and generates the image data. In addition, when the inverse quantization section 25 is not provided, the inverse orthogonal transformation section 26 performs the inverse orthogonal transformation using the transform coefficients output from the transform coefficient correction section 24, and generates the image data.

The inverse color conversion section 27 converts the image data obtained in the inverse orthogonal transformation section 26 into the image data of the desired color space. For example, when the color conversion section 11 converts the image data of R, G and B into the image data of Y, Cb and Cr, and the same image data of the color space as the image data input into the image encoding apparatus 10 are output in the image decoding apparatus 20, the inverse color conversion section 27 converts the image data of Y, Cb and Cr into the image data of R, G and B and then outputs the image data. In addition, the inverse color conversion section 27 may converts the image data of Y, Cb and Cr into the image data of the color space according to equipment connected to the image decoding apparatus 20 and then outputs the image data. In the image decoding apparatus 20 constituted as described above, the transform coefficient correction section 24 focuses on a bias of the transform coefficients obtained in the orthogonal transformation section 12, and corrects the values truncated in the post quantization section 16 to statistically optimal values. By performing such a correction, the transform coefficient correction section 24 can stably suppress a sense of incongruity or a sense of confusion occurring in a reproduced image more than a method according to the related art, that is, a method of adding random numbers to the transform coefficients or including noise in the decoded image data.

Figure 5:
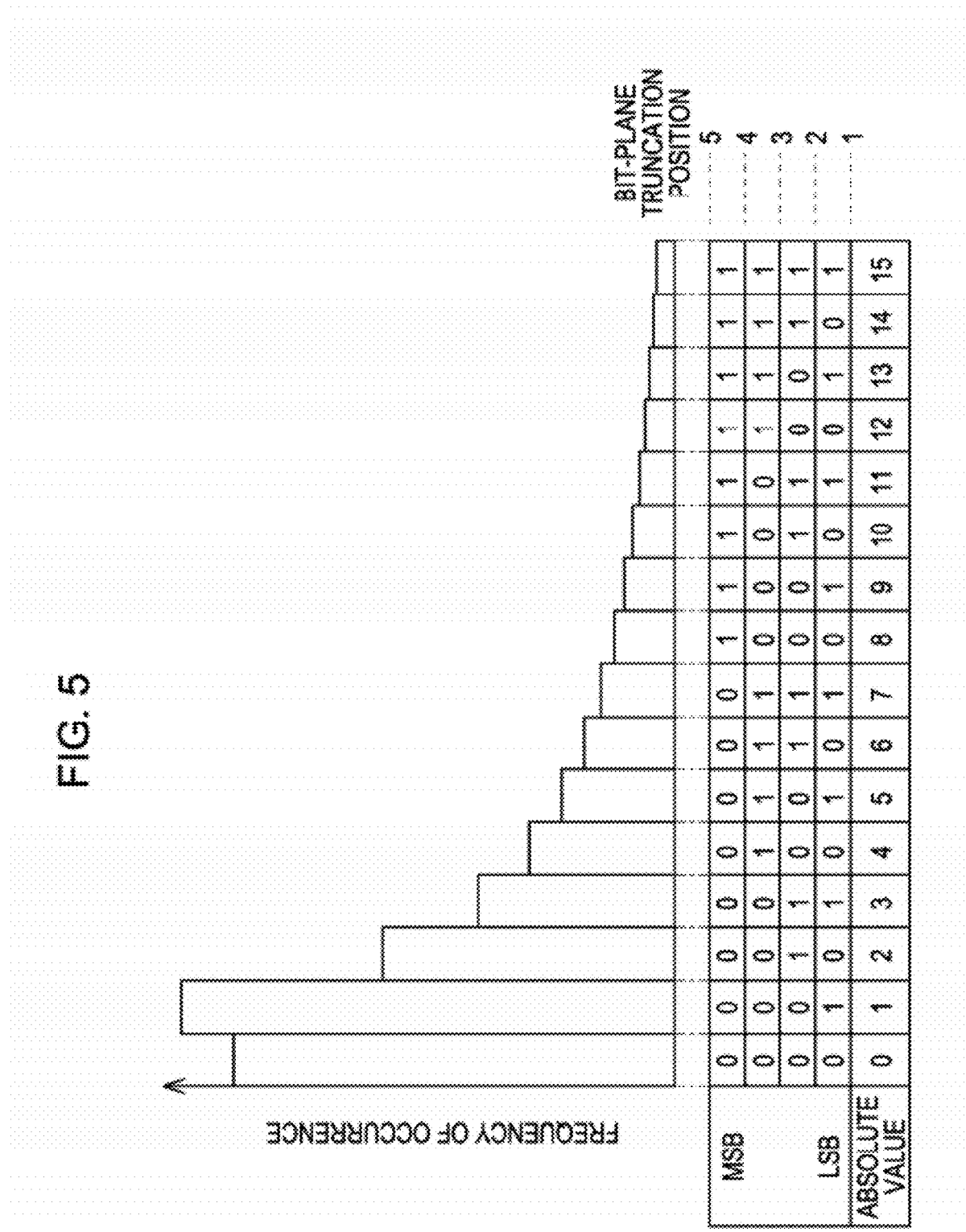
FIG. 5 is a diagram illustrating distribution of transform coefficients in a natural image.

FIG. 5 illustrates the distribution of the transform coefficients in a natural image. When the absolute values of the transform coefficients can be expressed as 4 bits, the frequency of occurrence of the absolute values of the transform coefficients monotonically decreases except for "0". For this reason, in each of the bits of the first bit, the second bit, the third bit and the fourth bit, the frequency of occurrence of an interval where "0" stands is higher than the frequency of occurrence of an interval where "1" stands. That is, as the bits in each position, "0" is more frequently generated than "1".

For example, in case of the fourth bit, the frequency of occurrence of an interval where "0" stands is equal to the sum totaled from the frequency of occurrence when the absolute value of the transform coefficient is "0" to the frequency of occurrence when the absolute value is "7". Further, the frequency of occurrence of an interval where "1" stands is equal to the sum totaled from the frequency of occurrence when the absolute value of the transform coefficient is "8" to the frequency of occurrence when the absolute value is "15". Here, the frequency of occurrence of an interval where "0" stands is higher than the frequency of occurrence of an interval where "1" stands, and in the fourth bit "0" stands easily.

Figure 6:
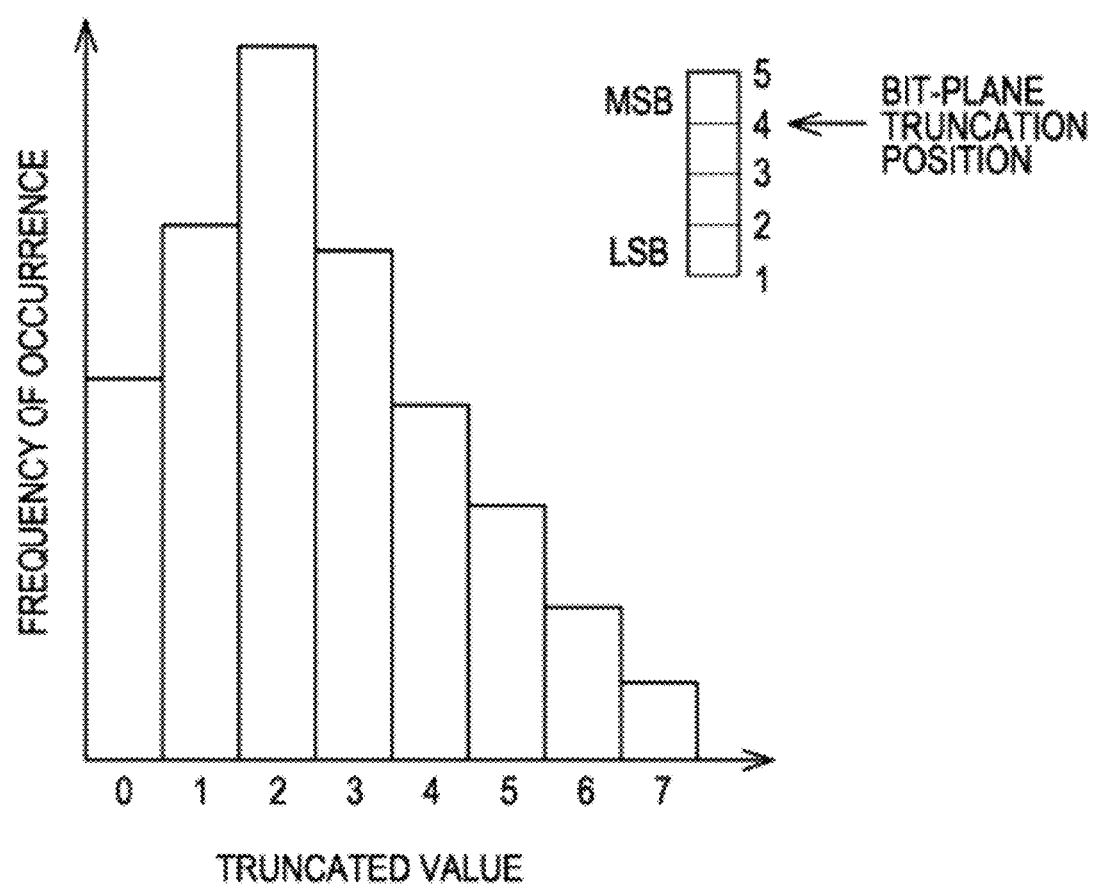
FIG. 6 is a diagram illustrating distribution of occurrence frequency of truncated coefficient values.

As seen from the above, since a bias occurs in the frequency of occurrence of "0" and "1" in each of the bits, a value truncated in an arbitrary truncation position is likely to become smaller than the average of expressible values to be determined by the truncation position. For example, when truncated in the fourth position "4" from the LSB side, the distribution of the frequency of occurrence of the truncated coefficient values is generally the same as FIG. 6, and an average of the truncated values is smaller than "4" and closer to "3" which is an average of the expressible values. When such a bias exists, using "3" rather than "4" as a correction value results in a smaller average of quantization error by the post quantization.

Therefore, with the correction value table previously prepared on the basis of these biases, the transform coefficient correction section 24 determines a statistically optimal correction value used to perform correction on the transform coefficients by using the prepared correction value table. In the preparation of the correction value table, when a plurality of learning image data has been encoded in the image encoding apparatus 10, the values truncated in the post quantization section 16 are statistically processed to determine the optimal correction value. In particular, the distribution of the values truncated in the post quantization section 16 is sought and stored as the central value representative of this distribution. As the central value representative of the distribution, for example, an average value is used. In addition, for the central value representative of distribution, a mode value or a median value may be used as the correction value.

Figure 7:
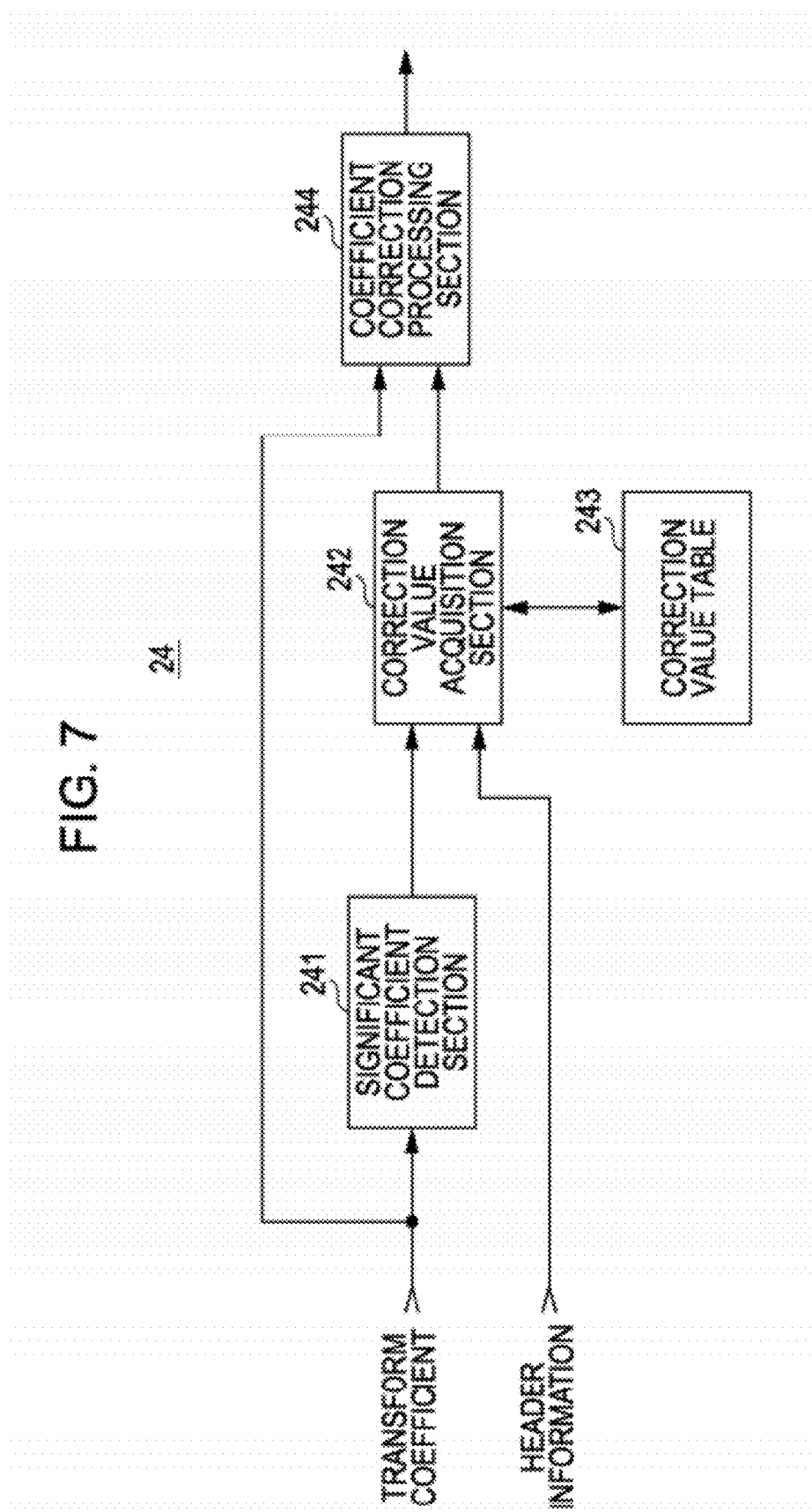
FIG. 7 is a diagram illustrating the configuration of a transform coefficient correction section.

FIG. 7 shows the configuration of the transform coefficient correction section 24. A significant coefficient detection section 241 of the transform coefficient correction section 24 detects whether the transform coefficient output from the bit modeling decoding section 23 is significant, in other words, whether the transform coefficient is not "0", and outputs the detected result to a correction value acquisition section 242.

The correction value acquisition section 242 performs the acquisition of the correction value on the basis of the bit-plane truncation position information supplied from the header analysis section 21 and the detected result output from the significant coefficient detection section 241. The correction value acquisition section 242 acquires the correction value corresponding to the bit-plane truncation position from a correction value table 243, and sets this correction value to be a correction value for the coefficient determined to be significant in the significant coefficient detection section 241. In addition, the correction value preparation section 242 sets to "0" the correction value of the coefficient determined not to be significant in the significant coefficient detection section 241.

When the bit-plane truncation position is shown from the correction value acquisition section 242, the correction value table 243 uniquely outputs the correction value corresponding to the bit-plane truncation position.

A coefficient correction processing section 244 adds the correction value acquired in the correction value acquisition section 242 to the transform coefficient supplied from the bit modeling decoding section 23 to perform correction on the transform coefficient, and outputs the transform coefficient after correction to the inverse orthogonal transformation section 26.

Next, an operation of the transform coefficient correction section 24 will be described. In the description below, correction is performed on the transform coefficient of FIG. 8(B) which corresponds to the transform coefficient shown in FIG. 8(A) on which truncation has been performed. For example, when the transform coefficients before truncation are "52, 242, 12, 3, 98, 105", and the bit-plane truncation positions are "5, 5, 3, 3, 3, 4", the transform coefficients after truncation but before correction become "48, 240, 12, 0, 96, 104".

The correction value table 243 of the transform coefficient correction section 24 shows the optimal correction values for each bit-plane truncation position. These optimal correction values are values which are set by statistically processing the values truncated for each bit-plane truncation position when a plurality of learning image data has been encoded. FIG. 9 illustrates the correction value table 243. The correction value table 243 outputs the correction values "148", "91", "52", . . . , "0" when the bit-plane truncation positions are, for example, "10", "9", "8", . . . , "1".

Figure 10:
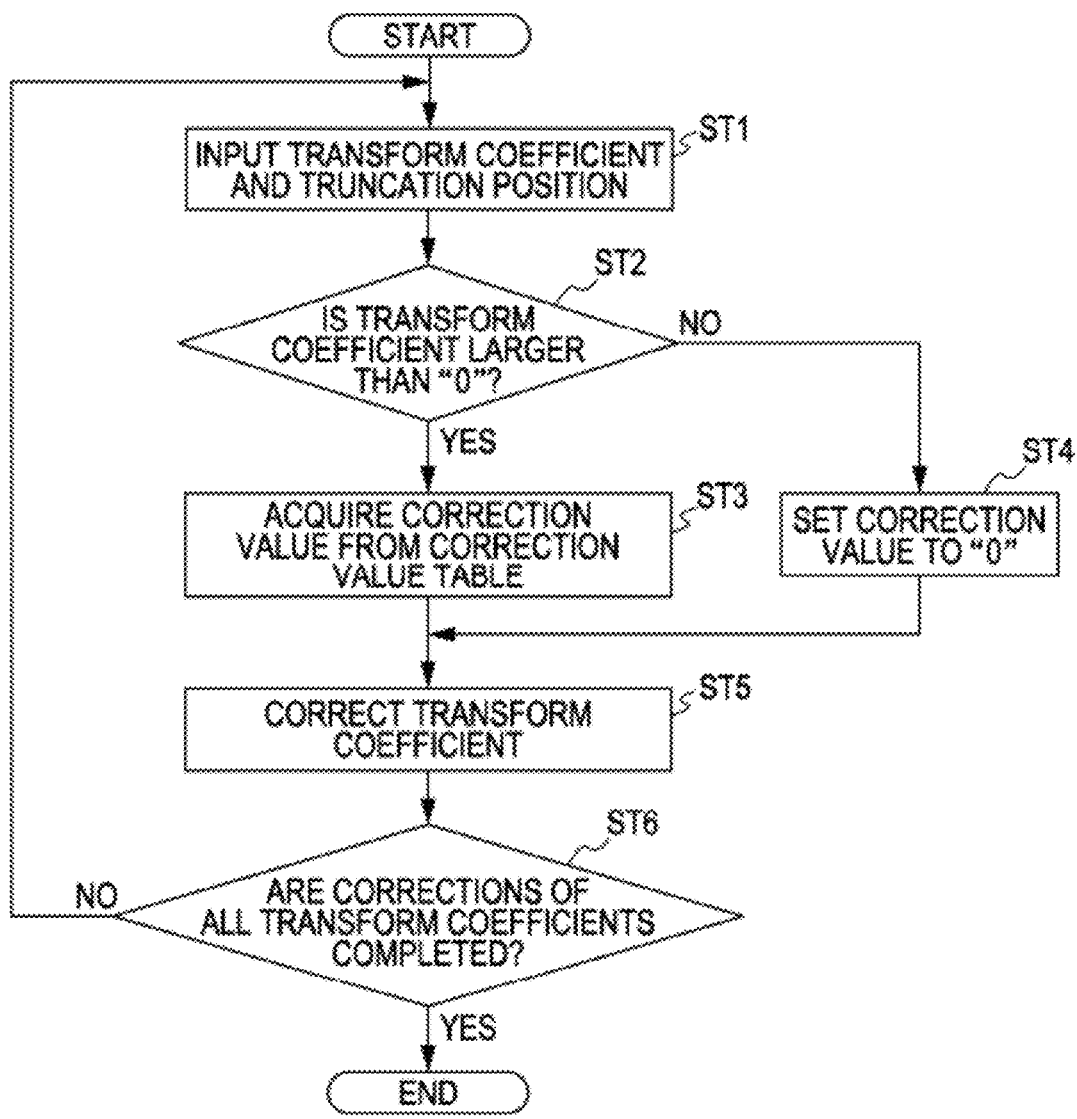
FIG. 10 is a flowchart illustrating an operation of the transform coefficient correction section.

FIG. 10 is a flowchart illustrating an operation of the transform coefficient correction section 24. In step ST1, the transform coefficient correction section 24 performs input on the transform coefficient and the bit-plane truncation position. The transform coefficient correction section 24 determines the bit-plane truncation position for the transform coefficient supplied from the bit modeling decoding section 23 on the basis of the bit-plane truncation position information supplied from the header analysis section 21, and proceeds to step ST2 by using the transform coefficients and the bit-plane truncation positions for each coefficient.

In step ST2, the transform coefficient correction section 24 determines whether the transform coefficient is larger than "0". The transform coefficient correction section 24 proceeds to step ST3 when the transform coefficient is larger than "0", or otherwise proceeds to step ST4 when the transform coefficient is "0".

In step ST3, the transform coefficient correction section 24 acquires the correction value from the correction value table. The transform coefficient correction section 24 acquires the correction value corresponding to the bit-plane truncation position information from the correction value table 243 and then proceeds to step ST5.

In step ST4, the transform coefficient correction section 24 sets the correction value to be "0" and then proceeds to step ST5.

In step ST5, the transform coefficient correction section 24 performs the correction on the transform coefficient using the correction value. The transform coefficient correction section 24 adds the correction value acquired in step ST3 or step ST4 to the transform coefficient, and performs the correction on the transform coefficient and then proceeds to step ST6.

In step ST6, the transform coefficient correction section 24 determines whether the correction of all the transform coefficients has been terminated. The transform coefficient correction section 24 returns to step ST1 when the correction of all the transform coefficients is not terminated, and performs the correction on a new transform coefficient. When the correction of all the transform coefficients has been terminated, the transform coefficient correction section 24 terminates the correction operation of the transform coefficients.

Figures 11A, 11B, 11C:
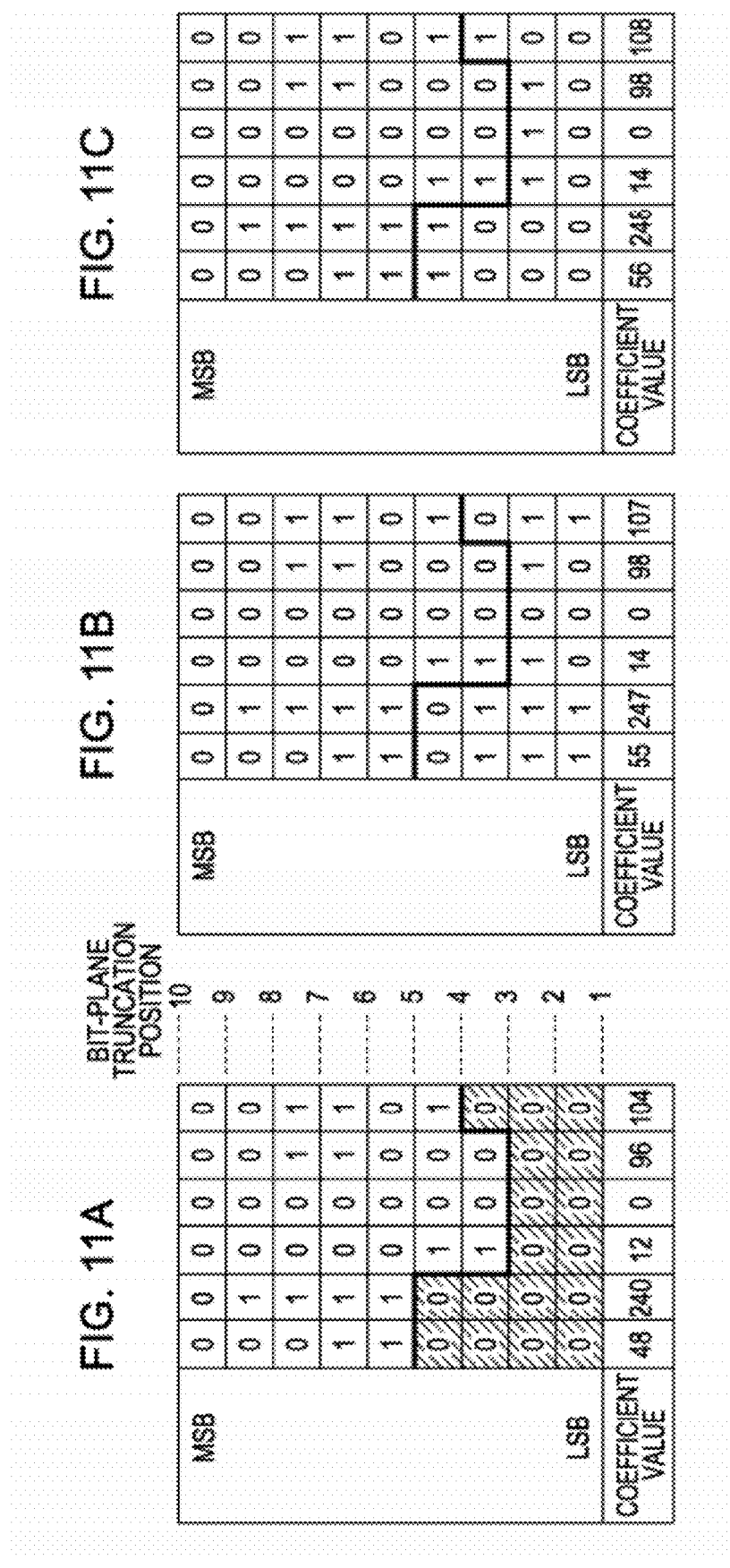

Therefore, when the transform coefficients are "48, 240, 12, 0, 96, 104", and the bit-plane truncation positions are "5, 5, 3, 3, 3, 4", as shown in FIG. 11(A), the correction values to be output from the correction value table become "7, 7, 2, 2, 2, 3". In addition, when the transform coefficient is "0", the correction value becomes "0". Therefore, the correction values to be added to the transform coefficients "48, 240, 12, 0, 96, 104" become "7, 7, 2, 0, 2, 3", and the transform coefficients after correction become the transform coefficients "55, 247, 14, 0, 98, 107" as shown in FIG. 11(B).

Meanwhile, FIG. 11(C) illustrates the case where the correction of the transform coefficient is performed by a method according to the related art in which the substantially central values of numerals expressible by the number of truncated bits are set to be values that the truncated bits have shown. For example, when only the most significant bits of the truncated bit range are set to be "1", the substantially central values of numerals expressible by the number of truncated bits are shown. In this case, the transform coefficients after correction become "56, 248, 14, 0, 98, 108".

As mentioned above, with the correction value, which were previously prepared by statistically processing the coefficient value truncated by the bit-plane truncation, being stored in the correction value table, the correction value is obtained by reading the correction value corresponding to the bit-plane truncation position from the correction value table. It is possible to correct the transform coefficient to a more optimal value than ever before, by performing the correction on the transform coefficient using the correction value obtained in this way. For example, the transform coefficients after correction as shown in FIG. 11(B) are values closer to the transform coefficients before bit-plane truncation as shown in FIG. 8(A) than the transform coefficients after correction as shown in FIG. 11(C), to thereby allow the transform coefficients to corrected to the more optimal value than ever before. Therefore, it is possible to stably suppress a sense of incongruity or a sense of confusion occurring in the image due to the bit-plane truncation.

3. Second Embodiment of the Image Decoding Apparatus

However, although the above-described transform coefficient correction section 24 has determined the optimal correction value by statistically processing the values truncated depending on the bit-plane truncation position, the distribution of the truncated values varies according to the characteristics of the input transform coefficient, for example, the position of the significant bit, color component information, frequency information, and the like. Here, the significant bit position is a bit position where the first significant bit "1" stands when scanning from MSB (most significant bit) of the intended transform coefficient toward LSB (least significant bit) thereof.

Here, when the image data of the natural image are encoded in the image encoding apparatus 10, it is easy for the truncated bit "0" to stand when the significant bit position moves from the MSB side to the LSB side in the truncated value in the post quantization section 16, and the difference of the frequency occurrences between "0" and "1" becomes wider and the bias becomes greater.

Consequently, the second embodiment focuses on the fact that the distributions of the truncated values are different by the context that is characteristics of the transform coefficient, and uses the context (for example, any one of the significant bit position, the color component information, the frequency information and the like, or a combination thereof) in addition to the bit-plane truncation position. Hereinafter, a case will be described where the significant bit position is used.

FIG. 12 shows the configuration of the transform coefficient correction section 24a, as another configuration of the transform coefficient correction section, which performs correction on the transform coefficient using the context in addition to the bit-plane truncation position.

The significant coefficient detection section 241 of the transform coefficient correction section 24a detects whether the transform coefficient supplied from the bit modeling decoding section 23 is significant, in other words, whether the transform coefficient is not "0", and outputs the detected result to the correction value acquisition section 242.

The significant bit detection section 245 detects the significant bit position of the transform coefficient supplied from the bit modeling decoding section 23, and outputs the detected result.

The correction value acquisition section 246 acquires the correction value on the basis of the bit-plane truncation position information supplied from the header analysis section 21, the detected result output from the significant coefficient detection section 241, and the detected result output from the significant bit detection section 245. The correction value acquisition section 246 acquires the correction value corresponding to the bit-plane truncation position and the significant bit position from the correction value table 247, and sets this correction value to be the correction value for the coefficient determined to be significant in the significant coefficient detection section 241. In addition, the correction value acquisition section 246 sets to "0" the correction value of the coefficient determined not to be significant in the significant coefficient detection section 241.

The correction value table 247 uniquely outputs the correction value corresponding to the bit-plane truncation position and the significant bit position, when the bit-plane truncation position and the significant bit position are shown from the correction value acquisition section 242.

The coefficient correction processing section 248 performs the correction on the transform coefficient by adding the correction value acquired in the correction value acquisition section 246 to the transform coefficient supplied from the bit modeling decoding section 23, and outputs the transform coefficient after correction to the inverse orthogonal transformation section 26.

Next, an operation of the transform coefficient correction section 24a will be described. In the description below, correction is performed on the transform coefficient of FIG. 8(B) which corresponds to the transform coefficient shown in FIG. 8(A) on which truncation has been performed. For example, when the transform coefficients before the truncation are "52, 242, 12, 3, 98, 105", and the bit-plane truncation positions are "5, 5, 3, 3, 3, 4", the transform coefficients after the truncation but before the correction become "48, 240, 12, 0, 96, 104".

The correction value table 247 of the transform coefficient correction section 24 statistically processes the truncated value for each bit-plane truncation position when a plurality of learning image data is encoded, and shows the optimal correction value set by this statistical processing for each bit-plane truncation position. FIG. 13 shows another example of the correction value table 247. The correction value table 247 is so constituted as to be capable of specifying the correction value from the bit-plane truncation position and the significant bit position. For example, when the bit-plane truncation position is "10", and the significant bit positions are "9, 8, 7, 6, 5, 4, 3, 2, 1", the correction values become "148, 0, 0, 0, 0, 0, 0, 0, 0". In addition, when the bit-plane truncation position is "9", and the significant bit positions are "9, 8, 7, 6, 5, 4, 3, 2, 1", the correction values become "95, 90, -, -, -, -, -, -, -". Similarly, the correction values are set depending on the bit-plane truncation position and the significant bit position. When the bit-plane truncation position is "1", and the significant bit positions are "9, 8, 7, 6, 5, 4, 3, 2, 1", the correction values become "0, 0, 0, 0, 0, 0, 0, 0, 0". Meanwhile, "-" in FIG. 13 represents that the corresponding conditions do not exist.

FIG. 14 is a flowchart illustrating an operation of the transform coefficient correction section 24a. In step ST11, the transform coefficient correction section 24a performs input on the transform coefficient and the bit-plane truncation position. The transform coefficient correction section 24a determines the bit-plane truncation position in the transform coefficient supplied from the bit modeling decoding section 23 on the basis of bit-plane truncation position information supplied from the header analysis section 21, and then proceeds to step ST12 by using the transform coefficient and the bit-plane truncation position for each coefficient.

In step ST12, the transform coefficient correction section 24a determines whether the transform coefficient is larger than "0". The transform coefficient correction section 24a proceeds to step ST13 when the transform coefficient is larger than "0", or otherwise proceeds to step ST15 when the transform coefficient is equal to "0".

In step ST13, the transform coefficient correction section 24a performs detection on the significant bit position. By scanning the transform coefficient from the MSB side, the transform coefficient correction section 24a detects a bit position where "1" first stands and then proceeds to step ST14.

In step ST14, the transform coefficient correction section 24a acquires the correction value from the correction value table. The transform coefficient correction section 24a acquires the correction value corresponding to the bit-plane truncation position and the significant bit position from the correction value table 247 and then proceeds to step ST16.

In step ST15, the transform coefficient correction section 24a sets the correction value to be "0" and then proceed to step ST16.

In step ST16, the transform coefficient correction section 24a performs the correction on the transform coefficient using the correction value. By adding the correction value acquired in step ST14 or step ST15 to the transform coefficient, the transform coefficient correction section 24a performs the correction on the transform coefficient and then proceeds to step ST17.

In step ST17, the transform coefficient correction section 24a determines whether the correction of all the transform coefficients has been terminated. The transform coefficient correction section 24a returns to step ST11 when the correction of all the transform coefficients is not terminated, and performs the correction on a new transform coefficient. In addition, when the correction of all the transform coefficients has been terminated, the transform coefficient correction section 24a terminates the operation of the correction of the transform coefficient.

Figures 15A, 15B:
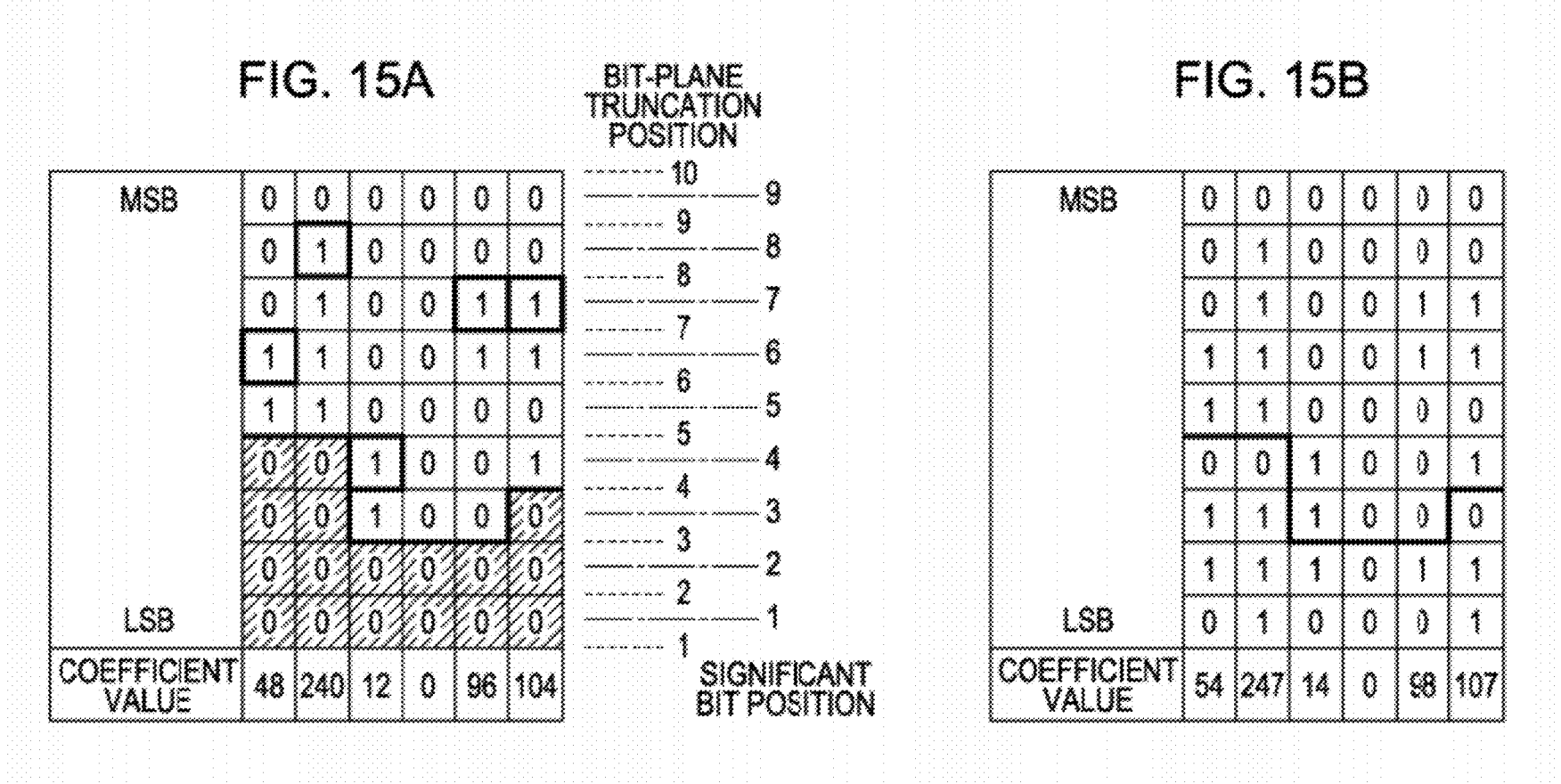

Therefore, as shown in FIG. 15(A), when the transform coefficients are "48, 240, 12, 0, 96, 104", the bit-plane truncation position are "5, 5, 3, 3, 3, 4", and the significant bit positions are "6, 8, 4, no significant bit position, 7, 7", the correction values output from the correction value table are "6, 7, 1, no correction value, 2, 3", respectively. In addition, when the transform coefficient is equal to "0", the correction value becomes "0". Therefore, the correction values to be added to the transform coefficient "48, 240, 12, 0, 96, 104" become "6, 7, 1, 0, 2, 3", and the transform coefficients after correction become the transform coefficients "54, 247, 13, 0, 98, 107" as shown in FIG. 15(B).

As seen from the above, it is possible to correct the transform coefficient to a more optimal value than when the correction value is acquired on the basis of the bit-plane truncation position, by acquiring the correction value according to the significant bit position as well as the bit-plane truncation position. Furthermore, it is possible to stably suppress a sense of incongruity or a sense of confusion occurring in the reproduced image by the bit-plane truncation.

Figure 16:
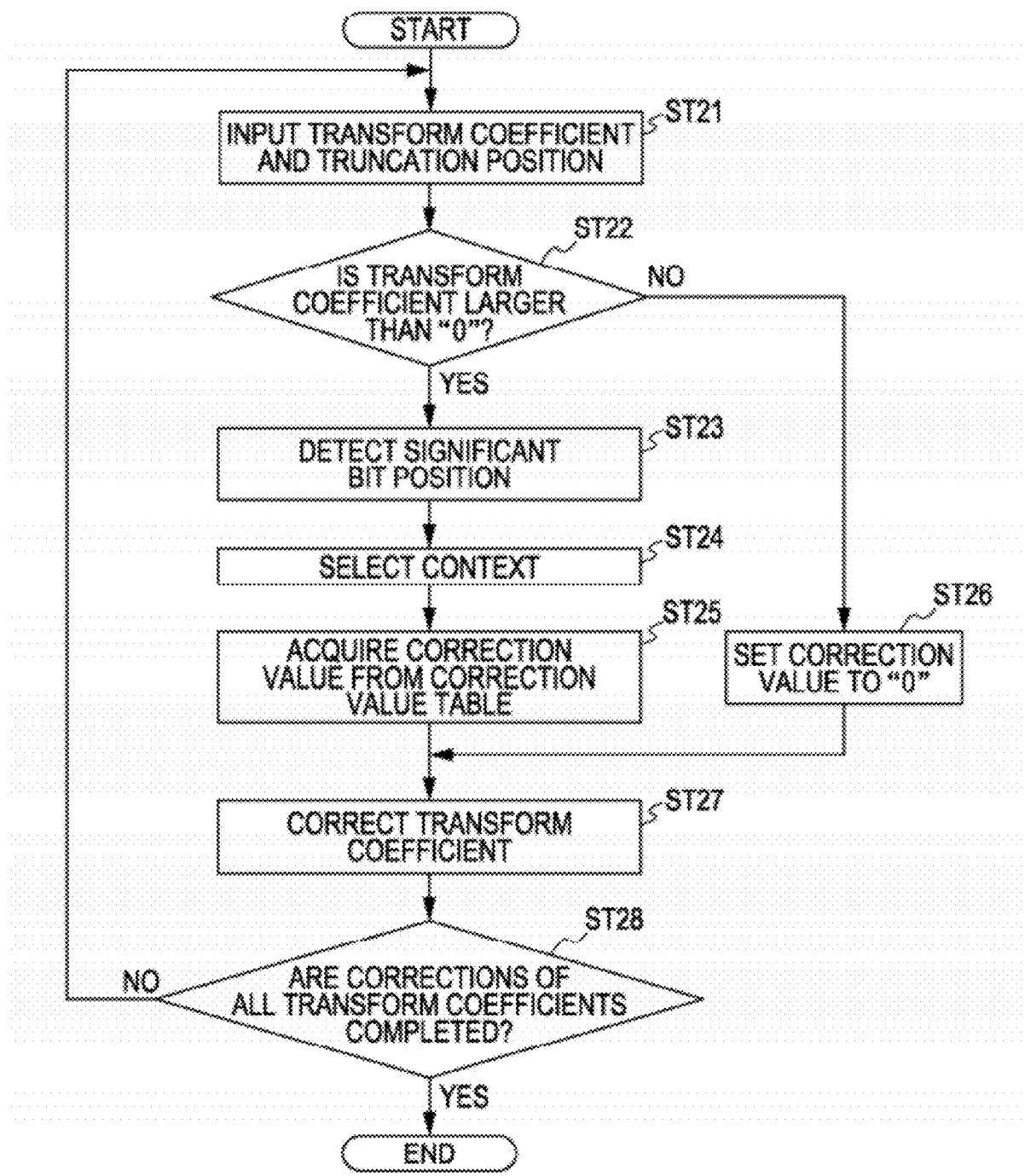
FIG. 16 is a flowchart illustrating another operation of the transform coefficient correction section.

In addition, when other contexts as well as the bit-plane truncation position and the significant bit position are used, processing shown in FIG. 16 may be performed by using the correction value table capable of specifying the correction value from the bit-plane truncation position, the significant bit position and other contexts.

In step ST21, the transform coefficient correction section 24a performs input on the transform coefficient and the bit-plane truncation position. The transform coefficient correction section 24a determines the bit-plane truncation position in the transform coefficient supplied from the bit modeling decoding section 23 on the basis of bit-plane truncation position information supplied from the header analysis section 21. In addition, the transform coefficient correction section 24a proceeds to step ST22 by using the transform coefficient and the bit-plane truncation position for each coefficient.

In step ST22, the transform coefficient correction section 24a determines whether the transform coefficient is larger than "0". The transform coefficient correction section 24a proceeds to step ST23 when the transform coefficient is larger than "0", or otherwise proceeds to step ST26 when the transform coefficient is equal to "0".

In step ST23, the transform coefficient correction section 24a performs the detection on the significant bit position. By scanning the transform coefficient from the MSB side, the transform coefficient correction section 24a detects the bit position where "1" first stands and then proceeds to step ST24.

In step ST24, the transform coefficient correction section 24a performs selection on the context. The transform coefficient correction section 24a selects, as contexts used in addition to the bit-plane truncation position, color component information representing which color component coefficient that the transform coefficient corresponds to, or frequency information representing which frequency component coefficient that the transform coefficient corresponds to, and then proceeds to step ST25. Which context is used may be previously set, and may be able to be selected by a user.

In step ST25, the transform coefficient correction section 24a acquires the correction value from the correction value table. The transform coefficient correction section 24a acquires the bit-plane truncation position, the significant bit position and the correction value corresponding to the context selected in step ST24 from the correction value table 247, and then proceeds to step ST27.

In step ST26, the transform coefficient correction section 24a sets the correction value to be "0" and then proceeds to step ST27.

In step ST27, the transform coefficient correction section 24a performs the correction on the transform coefficient using the correction value. By adding the correction value acquired in step ST25 or step ST26 to the transform coefficient, the transform coefficient correction section 24a performs the correction on the transform coefficient and then proceeds to step ST28.

In step ST28, the transform coefficient correction section 24a determines whether the correction of all the transform coefficients has been terminated. The transform coefficient correction section 24a returns to step ST21 when the correction of all the transform coefficients is not terminated, and performs the correction on a new transform coefficient. In addition, when the correction of all the transform coefficients has been terminated, the transform coefficient correction section 24a terminates the operation of the correction of the transform coefficient.

When such processes are performed, it is possible to perform better correction on the transform coefficient for each color component or for each frequency component.

Meanwhile, a series of processes described in this specification can be executed by hardware, or software, or a combination thereof. When a process is executed by software, it is possible to execute a program with a process sequence recorded thereon by installing the program in a memory within a computer incorporated into dedicated hardware, or to execute the program by installing the program in a general-purpose computer capable of executing various types of processes.

4. Configuration and Operation when Image Decoding is Performed Using a Computer FIG. 17 is a block diagram illustrating the configuration of a computer which executes a series of the processes described above by a program.

A computer 50 is a system which is constituted by an information processing device 51, a storage device 53 connected by the information processing device 51 and a bus 52, one or a plurality of recording and reproducing devices 54, and a user interface section 55 configured to use a mouse or a keyboard and the like in order for a user to perform manipulation and input to these devices, and also a system by which the image decoding process as described above is performed through an installed program.

The information processing device 51 can store, in the storage device 53, encoded data obtained by encoding motion picture contents which are stored in the storage device 53 configured to use an HDD and the like, or store, in the storage device 53, decoded image data (motion picture contents) obtained by decoding the encoded data stored in the storage device 53, or record the encoded data or the decoded image data in a recording medium by using the recording and reproducing device 54. In addition, the information processing device 51 is configured to be able to incorporate the motion picture contents recorded in the recording medium into the storage device 53. On this occasion, the information processing device 51 may encode the motion picture contents.

The information processing device 51 includes a microprocessor 511, a GPU (Graphics Processing Unit) 512, an XDR (Extreme Data Rate)-RAM 513, a bridge 514, an HDD 515, a communication interface (I/F) 516, and a sound input and output codec 517.

The GPU 512 is connected to the microprocessor 511 via a bus 521. The XDR-RAM 513 is connected to the microprocessor 511 via a bus 522. The bridge 514 is connected to an I/O controller 5114 of the microprocessor 511 via a dedicated bus.

The HDD 515, the USB interface 516, and the sound input and output codec 517 are also connected to the bridge 514. A speaker 61 is connected to this sound input and output codec 517. In addition, a display 62 is connected to the GPU 512.

A user interface section 55, recording and reproducing device 54, and a manipulation controller 56 are further connected to the bridge 514 via a PCI bus 52.

The user interface section 55 receives the manipulation and input of a user, and supplies a signal representing the content of the manipulation and input of a user via the PCI bus 52 and the bridge 514 to the microprocessor 511. The storage device 53 and the recording and reproducing device 54 are configured to be able to record or reproduce predetermined data.

A driver 57 is connected to the PCI bus 52 as necessary, and a removable media 58 such as a magnetic disk, an optical disk, optical magnetic disk, or a semiconductor memory is appropriately mounted thereon. A computer program read from these is installed in the HDD 515 as necessary.

The microprocessor 511 is a multi-core configuration where a main CPU core 5111, a plurality of sub-CPU cores 5112-1 to 5112-8 connected to the main CPU core 5111 via an internal bus 5115, a memory controller 5113, and the I/O controller 5114 are integrated into one chip. The main CPU core 5111 is responsible for executing a basic program such as OS (Operating System). The sub-CPU cores 5112-1 to 5112-8 are, for example, RISC (Reduced Instruction Set Computer) type signal processing processors. The memory controller 5113 is responsible for performing, for example, a memory control over the XDR-RAM 513. The I/O controller 5114 is responsible for managing input/output of data with the bridge 514.

When starting-up, the microprocessor 511 reads requisite application programs stored in the HDD 515, develops such programs in the XDR-RAM 513 on the basis of a control program stored in the HDD 515, and thereafter executes requisite control processing on the basis of the application programs and operator manipulation.

In addition, the microprocessor 511 fulfills, for example, the above-described image encoding process or image decoding process by executing software. Accordingly, the microprocessor can supply the encoded stream obtained as a result of encoding to the HDD 515 via the bridge 514 to store it, or performs data transfer of a reproduced video of moving image contents obtained as a result of decoding to the GPU 512 to thereby display the reproduced video on the display 62.

Although methods of using each of the CPU cores within the microprocessor 511 are arbitrary, for example, the main CPU core 5111 may perform the process relating to control of the image encoding process or the image decoding process, and may cause eight sub-CPU cores 5112-1 to 5112-8 to execute simultaneously in parallel each of the processes such as wavelet transform, coefficient rearrangement, entropy encoding, entropy decoding, wavelet inverse transformation, quantization, and inverse quantization. On this occasion, when the main CPU core 5111 allocates the process on the line block (precinct) basis with respect to each of the eight sub-CPU cores 5112-1 to 5112-8, the image encoding process or the image decoding process is executed simultaneously in parallel on the line block basis. In other words, it is possible to shorten the delay time of the entire process by improving efficiency of the image encoding process or the image decoding process, and to further reduce load, processing time, and memory capacity necessary for the process. Of course, each of the processes may be performed with methods other than this. Also, for example, a portion of eight sub-CPU cores 5112-1 to 5112-8 of the microprocessor 511 can execute the encoding process, and other portions can execute the decoding process simultaneously in parallel.

Further, the main CPU core 5111 also performs processes other than those performed by the sub-CPU cores. For example, the main CPU core 5111 receives instructions supplied from the user interface section 55 or the manipulation controller 56 via the bridge 514, and executes a variety of processes in response to the instructions.

The GPU 512 performs final rendering processing relating to texture attachment and the like in activating a reproduced video of motion picture contents displayed on the display 62. In addition, the GPU 512 is so constituted so as to perform coordinate transformation computing processing in displaying a plurality of reproduced videos of motion picture contents and still images of still picture contents on the display 62 at one time, or expansion and contraction processing for the reproduced video of motion picture contents and the still image of still picture contents, and the like, to thereby reduce the processing burden of the microprocessor 511.

This GPU 512 performs predetermined signal processing with respect to the supplied video data of motion picture contents or image data of still picture contents along with control of the microprocessor 511, and sends the video data or the image data obtained as a result to the display 62, thereby causing the image to be displayed on the display 62.

When a series of processes described above is executed by software, a program constituting the software is installed from a network or a recording medium. This program can be previously recorded in, for example, a hard disk or ROM (Read Only Memory) used as a recording medium. Otherwise, the program can be stored (recorded) temporally or permanently in a removable recording medium such as a flexible disk, a CD-ROM (Compact Disc Read Only Memory), a MO (Magneto optical) disk, a DVD (Digital Versatile Disc), a magnetic disk, and a semiconductor memory. Such a removable recording medium can be supplied as so-called packaged software.

In addition to being installed in a computer from the removable recording medium as described above, the program is transmitted wirelessly from a download site to the computer, or transmitted by using wires to the computer via LAN (Local Area Network) or a network called Internet.

Meanwhile, the computer receives the program transmitted in this manner, and then allows the program to be installed in a recording medium such as an internal hard disk.

In the description above, although the configuration where eight sub-CPU cores are embedded in the microprocessor 511 has been described, the number of sub-CPU cores is arbitrary, without being limited to this. Further, the microprocessor 511 may be constituted by a single core (one core). Furthermore, instead of the microprocessor 511, a plurality of CPUs may be used, and a plurality of information processing devices may be also used.

In addition to being installed in a computer from the removable recording medium as described above, a computer program may be transmitted wirelessly from a download site to the computer, or transmitted by using wires to the computer via LAN (Local Area Network) or a network called Internet. In this case, the computer receives the program transmitted in this manner, and then allows the program to be installed in a recording medium such as an internal hard disk.

The present application contains subject matter related to that disclosed in Japanese Priority Patent Application JP 2008-288604 filed in the Japan Patent Office on Nov. 11, 2008, the entire content of which is hereby incorporated by reference.

The present invention should not be construed as limited to the embodiments set forth herein. The embodiments of the present invention have been disclosed for illustrative purposes, and it will apparent to those skilled in the art that various modifications or substitutions and the like for the embodiments can be made without departing from the scope of the invention. That is to say, allowance should be made for the claims in order to determine the gist of the invention.

What is claimed is:

1. An image decoding apparatus comprising:
   at least one processor;
   an information acquisition section to acquire information of a bit-plane truncation position in an encoded stream, from the encoded stream generated by performing a bit-plane encoding process on a transform coefficient obtained by frequency conversion of image data;
   a decoding process section to perform a decoding process on the encoded stream and generate a transform coefficient;
   a significant coefficient detection section to detect whether the transform coefficient generated in the decoding process section is significant;
   a correction value acquisition section to acquire a correction value that corresponds to the bit-plane truncation position in the transform coefficient detected to be significant in the significant coefficient detection section, from a correction value table where one or more correction values, previously prepared by statistically processing one or more coefficient values truncated by the bit-plane truncation, is stored for each bit-plane truncation position; and
   a coefficient correction processing section to perform coefficient correction processing on the transform coefficient using the correction value acquired in the correction value acquisition section for the transform coefficient detected to be significant in the significant coefficient detection section.

2. The image decoding apparatus according to claim 1, wherein the one or more correction values are stored in the correction value table for each context each context including one or more characteristics of image data, and
   wherein the correction value acquisition section acquires from the correction value table a correction value that corresponds to the bit-plane truncation position and a context.

3. The image decoding apparatus according to claim 2, wherein the context includes a significant bit position of the transform coefficient,
   wherein the image decoding apparatus further comprises a significant bit detection section to detect the significant bit position of the transform coefficient obtained in the decoding process section, and
   wherein the correction value acquisition section acquires the correction value based at least in part on the significant bit position detected by the significant bit detection section.

4. The image decoding apparatus according to claim 2, wherein the context includes color component information representing a color component coefficient to which the transform coefficient corresponds, frequency component information representing a frequency component coefficient to which the transform coefficient corresponds, or a combination of a color component coefficient and frequency component information,
   wherein the information acquisition section performs acquisition of the color component information and/or the frequency component information from the encoded stream, and
   wherein the correction value acquisition section acquires the correction value based at least in part on the color component information and/or the frequency component information acquired by the information acquisition section.

5. The image decoding apparatus according to claim 1, wherein a central value that is representative of the distribution of the one or more coefficient values truncated by the bit-plane truncation, is stored in the correction value table for each bit-plane truncation position.

6. An image decoding method comprising:
   acquiring information of a bit-plane truncation position in an encoded stream by an information acquisition section, from the encoded stream generated by performing a bit-plane encoding process on a transform coefficient obtained by frequency conversion of image data;
   performing a decoding process on the encoded stream and generating a transform coefficient by a decoding process section;
   detecting whether the transform coefficient generated in the decoding process section is significant by a significant coefficient detection section;
   acquiring a correction value that corresponds to the bit-plane truncation position in the transform coefficient detected to be significant in the significant coefficient detection section by a correction value acquisition section, from a correction value table where one or more correction values, previously prepared by statistically processing one or more coefficient values truncated by the bit-plane truncation, is stored for each bit-plane truncation position; and
   performing coefficient correction processing on the transform coefficient by a coefficient correction processing section using the correction value acquired in the correction value acquisition section for the transform coefficient detected to be significant in the significant coefficient detection section.

7. At least one recording medium having encoded thereon executable instructions that, when executed by at least one computer, causes the at least one computer to function as functional means for:
  acquiring information of a bit-plane truncation position in an encoded stream from the encoded stream generated by performing a bit-plane encoding process on a transform coefficient obtained by frequency conversion of image data;
  performing a decoding process on the encoded stream and generating a transform coefficient;
  detecting whether the transform coefficient generated by performing a decoding process on the encoded stream is significant;
  acquiring a correction value that corresponds to the bit-plane truncation position in the transform coefficient detected to be significant in a significant coefficient detection section, from a correction value table where one or more correction values, previously prepared by statistically processing one or more coefficient values truncated by the bit-plane truncation, is stored for each bit-plane truncation position; and
  performing coefficient correction processing on the transform coefficient using the correction value acquired from the correction value table for the transform coefficient detected to be significant.

* * * * *